United States Patent
Khoo et al.

(10) Patent No.: US 8,045,982 B2
(45) Date of Patent: Oct. 25, 2011

(54) METHODS FOR SITE SELECTION IN A MULTI-SITE COMMUNICATION SYSTEM

(75) Inventors: Hun Weng Khoo, Pul (MY); John P. Belmonte, Schaumburg, IL (US); Dipendra M. Chowdhary, Hoffman Estates, IL (US); Yueh Ching Chung, Pul (MY); David G. Wiatrowski, Woodstock, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 573 days.

(21) Appl. No.: 12/253,478

(22) Filed: Oct. 17, 2008

(65) Prior Publication Data
US 2010/0099404 A1  Apr. 22, 2010

(51) Int. Cl.
*H04W 4/00* (2009.01)
(52) U.S. Cl. .......... 455/434; 455/433; 455/432.1; 455/67.11; 455/435.2; 370/332
(58) Field of Classification Search .......... 455/433, 455/434, 432.1, 67.11, 435.2; 370/331, 332, 370/328
See application file for complete search history.

(56) References Cited

U.S. PATENT DOCUMENTS

| | | | |
|---|---|---|---|
| 6,185,423 B1* | 2/2001 | Brown et al. | 455/434 |
| 7,369,869 B2 | 5/2008 | Wiatrowski | |
| 2004/0033804 A1* | 2/2004 | Binzel | 455/437 |
| 2008/0014928 A1 | 1/2008 | Chen | |
| 2008/0014934 A1 | 1/2008 | Balasubramanian et al. | |

OTHER PUBLICATIONS

PCT International Search Report Dated Apr. 26, 2010.

* cited by examiner

*Primary Examiner* — Kamran Afshar
*Assistant Examiner* — Dung Lam
(74) *Attorney, Agent, or Firm* — Valerie M. Davis (57) ABSTRACT

A device detects a first signal on a channel that is one of a plurality of channels arranged in a first order on a list, with each channel being associated with a different site in a multi-site communication system. Upon detecting the first signal, the device attempts to measure and record signal strength of a signal at each channel on the list based on the first order beginning with the detected first signal, and selects as a home site the site associated with the channel having the signal with the highest recorded signal strength. The device rearranges the channels on the list into a second order based on the recorded signal strengths with the home site channel at the top. If necessary, the radio attempts to awaken its repeaters one after another based on the second order until a repeater is found to transmit a signal.

13 Claims, 4 Drawing Sheets

METHODS FOR SITE SELECTION IN A MULTI-SITE COMMUNICATION SYSTEM

TECHNICAL FIELD

The technical field relates generally to communication systems, and in particular, it relates to a wireless communication device automatically selecting a site for its communications while roaming in a multi-site communication system.

BACKGROUND

Multi-site communication systems provide wide-area coverage for users of the system. These systems comprise a number of sites, with each site corresponding to a different geographic coverage area and each site having located therein an infrastructure device (which will hereinafter be referred to as a repeater) serving the coverage area by managing one or more channels (e.g., uplink and downlink channels, time slots, radio frequency channels, etc.) in the coverage area. Accordingly, for purposes of the teachings herein, a site is characterized by a repeater that serves a particular coverage area, a channel for wireless communication device transmissions, and a system identification that identifies transmissions from the repeater on the channel at the site. Some or all of the infrastructure devices in a multi-site communication system may be networked or connected together to provide the wide-area coverage, and in many instances two or more of the coverage areas have some degree of overlap.

Multi-site communication systems may be designed as trunked systems or conventional systems. In trunked systems, a limited number of communication channels are shared among a much larger number of users to facilitate efficient use of the system's communication resources. Thus, to afford each user a reasonable opportunity to use the system's resources, one or more control channels are utilized by the infrastructure to allocate the shared resources between the many users in the system. In general, when a wireless communication device (which will hereinafter be referred to as a radio) wants to communicate on the trunked system, it sends a request on the control channel to communicate with another radio or group of radios. In turn, the requesting radio (and the radios to which it desires to communicate) receives back on the control channel the allocation of a traffic channel to use for their communications. Upon the conclusion of the communications, the allocated channel is released for use by other radios in the system.

In conventional systems, a number of communication channels are also shared amongst a number of users (although the number of users per channel is typically much smaller than in trunked systems). However, there is no control mechanism provisioned in the infrastructure to allocate the resources among the users in the system. Thus, in contrast to a trunked system, each channel in a conventional system is dedicated to one or more groups of users enabling the users to control access to the channels through their radios by manually selecting a channel or selecting a talkgroup that is assigned a particular channel.

As a user roams or travels in a multi-site communication system, the user may move from one coverage area served by one repeater of which it is aware to a new coverage area served by a different repeater of which it may not be aware. In that case, the user's radio must be able to detect the repeater in the new coverage area to facilitate communications in that coverage area. In trunked systems, naturally, the control channels can be used to help radios locate a repeater. More particularly, the repeaters periodically send out a message on the control channel that identifies the repeater (e.g., via the system identification) and that provides addressing for contacting the repeater. Moreover, the repeaters in trunked systems are generally continuously keyed, which helps to locate a repeater, and some repeaters transmit adjacent site information that can assist a radio in finding a suitable repeater.

Conventional systems do not use control channels to locate a repeater upon a radio moving to a new coverage area. However, in some conventional systems, the repeaters periodically broadcast beacon messages that serve the same purpose as the messages sent on the control channel in that they identify the repeater and provide contact information for the repeater. However, the transmission of beacon messages is not allowed in all conventional communication systems for various reasons including transmission regulations.

An alternative manual method could be used to find a repeater in a conventional system, which involves a user manually tuning his radio in an attempt to locate the repeater for the coverage area in which he is currently located. As might be expected, this approach can be cumbersome, time consuming, and not the most effective method of finding the repeater that provides the radio with the best signal strength for transmitting and receiving the radio's communications. In addition, some conventional systems require the repeater to de-key or enter into an inactive sleep mode when there have been no transmissions on its channel(s) for a certain length of time. This can further exacerbate the problem of a radio locating the repeater upon entering the repeater's coverage area, especially if there happens to be a relatively lengthy time until the next transmission by the repeater on the channel.

Thus, there exists a need for a method for site selection by a radio in a multi-site communication system that can be used in conventional multi-site communication systems.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, methods for selecting a site in a multi-site communication system are described with reference to various embodiments. In accordance with a "passive" site selection method, a wireless communication device detects a first signal on a channel in the communication system, wherein the channel is one of a plurality of channels that are arranged in a first order on a list of channels, and wherein each of the channels on the list is associated with a different site in a multi-site communication system. Upon detecting the first signal, the device attempts during a first time frame to measure and record signal strength of a signal at each of the channels on the list based on the first order and beginning with the detected first signal, and selects as a current home site the site associated with the channel on the list having the signal with a highest signal strength recorded during the first time frame. The device then rearranges the channels on the list into a second order based on the signal strengths recorded during the first time frame. Accordingly, attempting to measure and record signal strength for each channel on the channel list is extended to check the rest of the channels on the list after a signal on one of the channels is detected. This guards against selecting a home site during a time interval when the repeaters are each transitioning to an active mode. In another embodiment, prior to confirming a home site, the device confirms that a signal is still present on a channel before the channel's signal strength is used as the basis for selecting a home site. This guards against selecting a home site during a time interval when the repeaters are each transitioning to a sleep mode.

In accordance with an "active" site selection method, a wireless communication device arranges a plurality of channels on a list during a first time frame, wherein each of the channels on the list is associated with a different site in a multi-site communication system and is managed by a different repeater at the associated site, wherein each repeater has an active mode and a sleep mode and is associated with a known system identification, and wherein the channels on the list are arranged in a first order beginning with the channel associated with a current home site. Thereafter, the device determines to transmit a signal, and beginning with the channel associated with the current home site, when no signal is detected from the repeater managing the channel and associated with the known system identification, attempts to awake the repeater from the sleep mode to the active mode, and if the attempt to awake is successful, uses the repeater to transmit the signal.

Otherwise, the device selects the next channel in the first order and when no signal is detected from the repeater managing the channel and associated with the known color code, attempts to awake the repeater from the sleep mode to the active mode, and if the attempt to awake is successful, uses the repeater to transmit the signal. The device repeats this process of selecting the next channel in the first order and attempting to transmit on the channel until a first repeater is confirmed as being in the active mode and having the known system identification or until all of the channels on the list have been selected at least once. If a repeater is confirmed as being in the active mode and having the known system identification, the device uses the first confirmed repeater to transmit the signal and chooses, as the new home site, the site associated with the channel managed by the first confirmed repeater. Those skilled in the art will realize that the above recognized advantages and other advantages described herein are merely illustrative and are not meant to be a complete rendering of all of the advantages of the various embodiments.

Figure 1:
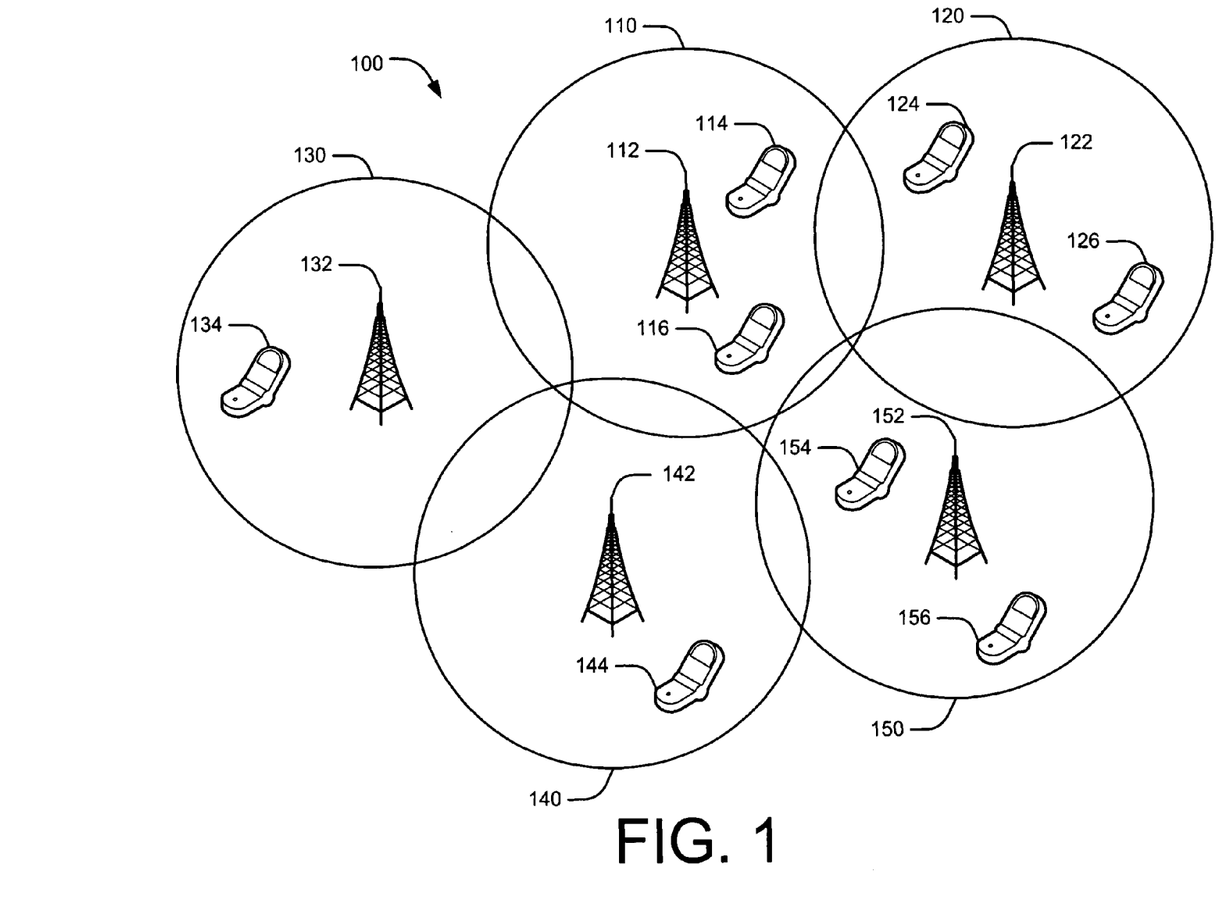
FIG. 1 is a block diagram of a wireless communication network in which may be implemented some illustrative embodiments.

Referring now to the drawings and in particular to FIG. 1, a conventional wireless communication network 100 is depicted in which may be implemented some illustrative embodiments. Network 100 comprises sites 110, 120, 130, 140, and 150 each having at least one repeater located in a geographic coverage area as indicated by the circles drawn in the figure, wherein all of the repeaters in this illustrative embodiment are networked together and there is no central controller for the repeaters as is common in conventional systems. More particularly, site 110 includes a repeater 112 that manages at least one channel at site 110. Site 120 includes a repeater 122 that manages at least one channel at site 120. Site 130 includes a repeater 132 that manages at least one channel at site 130. Site 140 includes a repeater 142 that manages at least one channel at site 140. Site 150 includes a repeater 152 that manages at least one channel at site 150. Moreover, each site is associated with a different system identification such as a color code, a Network Access Code, a PL (private line) tone or a DPL (digital private line) word (but that will hereinafter be referred to as a color code) that uniquely identifies transmissions from the repeater at the site.

Each repeater in network 100 is capable of operating in an active repeater mode or de-keying to an inactive sleep mode. A repeater de-keys when the channel(s) that it manages have not been used for radio transmission for some predetermined period of time. As is known in the art, de-key (and conjugations of "de-key") means that the repeater's transmitter is turned off. Further known in the art, de-keyed means that the repeater's downlink channel (for repeater to radio transmissions) is inactive while the repeater's uplink channel (for radio to repeater transmissions) remains active and available to detect radio transmissions. When the repeater is de-keyed, even though the repeater is able to detect transmissions from the radio, the repeater cannot process and repeat those transmissions because the radio and the repeater are not synchronized. Thus, when the repeater is de-keyed, a radio cannot utilize the repeater for communications until a) the radio sends a wakeup message to the repeater which causes the repeater to re-key to the active mode and b) the radio synchronizes to the repeater to receive timing information about the repeater. After the wakeup and synchronization processes are completed, then a radio may finally utilize the repeater for communications.

Further illustrated are radios 114 and 116 operating in site 110, radios 124 and 126 operating in site 120, radio 134 operating in site 130, radio 144 operating in site 140, and radios 154 and 156 operating in site 150. Each radio has access to a list of the channels at sites 110 through 150 that the radio can select for its transmissions and receptions. In an embodiment, the list is stored in the radio's memory. In accordance with the teachings herein, the radio implements various methods to select a home site associated with a channel on the list and to arrange the channels on the list in an order to facilitate the radio quickly finding a channel when it needs to transmit. The home site is the site that the radio will first attempt to use for its transmissions and receptions.

Since the radios are mobile, the radios and the repeaters communicate over an air interface using an air interface protocol that can be either standard or proprietary. One such standard is a Digital Mobile Radio (DMR) air interface standard, which specifies various protocols used by two-way radios (that can both transmit and receive signals) at the data link layer (i.e., layer 2) of the well known seven-layer Open Systems Interconnection computer networking model, and which is described in ETSI TS (Technical Specification) 102 361-1 v1.4.5 (2007-12) published by European Telecommunication Standards Institute (ETSI). The ETSI DMR standard specifies a two-slot Time Division Multiple Access (TDMA) structure that transmitting and receiving devices can utilize to send voice and/or data signals. The voice and data signals are transmitted in the TDMA slots in accordance with a general burst format specified in the standard. However, any other proprietary or standard air interface protocols could be used in network 100.

In addition, the radios and repeaters can communicate information over a channel using any modulation scheme including, but not limited to, TDMA (having any slotting structure), Frequency Division Multiple Access (FDMA), Code Division Multiple Access (CDMA), Orthogonal Frequency-Division Multiple Access (OFDMA), to name a few. As such, those skilled in the art will recognize and appreciate that the specifics of this example are merely illustrative of some embodiments and that the teachings set forth herein are applicable in a variety of alternative settings. Thus, since the teachings described do not depend on the environment, they can be applied to any type of wireless communication network or system having any number sites, repeaters and radios, wherein the radios have access to a list of the channels that can be used at the various sites in the network.

Referring again to FIG. 1, each repeater and radio is at least equipped with a transceiver (i.e., transmitter and receiver apparatus), a memory and a processing device and is further equipped with any additional components as needed for a commercial embodiment. The transceiver, memory and processing device can have any suitable physical implementation and are topologically coupled depending on the particular device implementation. These components are further operatively coupled and can be adapted, arranged, configured, and designed to perform methods in accordance with the teachings herein, for example, as illustratively described by reference to FIG. 2 through FIG. 4.

As referred to herein, a radio includes, but is not limited to, devices commonly referred to as wireless communication devices, access terminals, mobile radios, mobile stations, subscriber units, user equipment, mobile devices, or any other device capable of operating in a wireless environment, and are referred to herein simply as radios. Examples of radios include, but are not limited to, two-way radios, mobile phones, cellular phones, Personal Digital Assistants (PDAs), laptops and two-way pagers. As used herein, a repeater is a device that is a part of a fixed network infrastructure and can receive information (either control or media, e.g., data, voice (audio), video, etc.) in a signal from a radio and transmit information in signals to one or more radios via a communication link. A repeater includes, but is not limited to, equipment commonly referred to as infrastructure devices, base radios, base stations, base transceiver stations, access points, routers or any other type of infrastructure equipment interfacing a wireless communication device in a wireless environment, and is referred to herein simply as a repeater.

As mentioned earlier, the devices in network 100 communicate using communication links (also referred to herein as channels). The channels are the physical communication resources over which information is sent between the devices within network 100 and can comprise wired links or wireless links. If the channels comprise wireless links, the corresponding physical resource is an allocation of radio spectrum that is partitioned into radio frequency (RF) carriers that are modulated by a media or control stream. As it relates to the embodiments described herein, the terms signal, communication and transmission refer to messages emanating from one device. As such, signals, communications, and transmissions may generically refer to voice, data, or control information relating to network 100. The term call refers to related transmissions between radios in network 100.

Moreover, since the repeaters are networked together, at least one channel managed by each repeater is coupled together to form a "wide-area channel" on which radios at different sites can hear the same transmissions. Accordingly, during each transmission on the wide-area channel, "all sites light up" so that each repeater is repeating the same signal while in the active mode. This further means that the repeaters all transition to the active mode together (although not necessarily synchronously from a radio's perspective) and that the repeaters all transition to the sleep mode together (although not necessarily synchronously from a radio's perspective).

Figure 2:
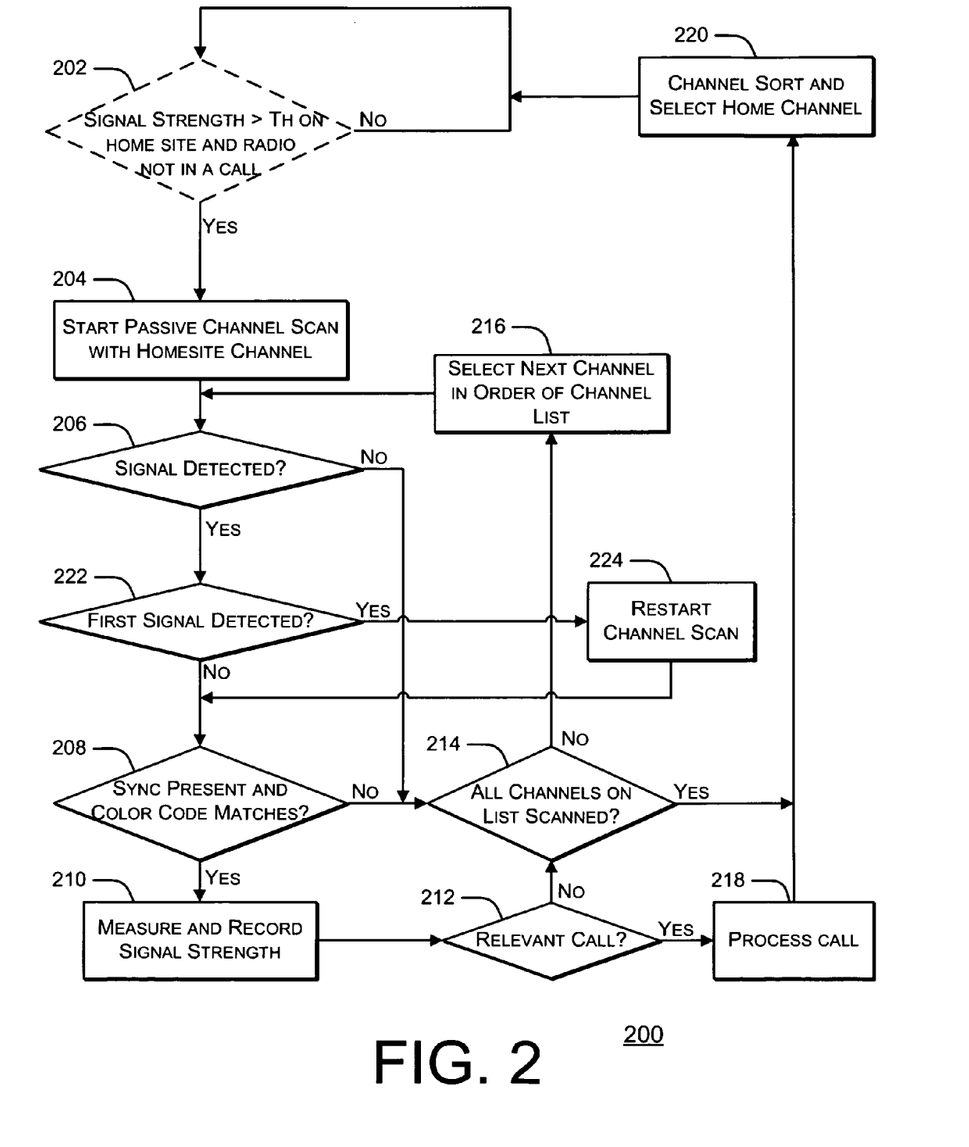
FIG. 2 is a flow diagram of a method for site selection in accordance with an illustrative embodiment.

FIG. 2 is a flow diagram of a method 200 performed by a radio for passive site selection in accordance with an illustrative embodiment. The site selection method is deemed "passive" because the radio is not required to send messages to the repeater in order to perform the method. The radio simply passively scans the channels in its channel list in an attempt to detect and measure signal strength of signals on the channels in order to select a home site based on these measurements. The channels in the channel list are arranged in a given order at the start of each passive channel scan with a channel associated with the radio's current home site being the first channel in the given order. Results of each passive scan are further used to rearrange the order of the channel list for use in performing an active site selection method in accordance with another embodiment of the teachings herein as illustrated by reference to FIG. 4.

In an embodiment that that does not interfere with the radio's transmission of signals or reception of signals of interest, the radio performs method 200 when (202) the radio is not in a call, i.e., actively transmitting signals or actively receiving a signal of interest. Moreover, in an embodiment that facilitates power saving in the radio, the radio does not continuously perform method 200 even when it is not in a call but has some internal policy for when and how often it performs the passive channel scan. For example, the radio starts (204) a passive channel scan only upon expiration of a timer set by the radio at the conclusion of a call and at the conclusion of every passive channel scan. Alternatively, or in addition, the radio monitors the channel at its home site (also referred to herein as its "home site channel") and starts (204) the passive channel scan when (202) the signal strength measured for a signal detected on its home site channel falls below a known threshold. In another illustrative implementation, the radio receives periodic beacon messages on its home site channel, and the radio starts the passive scan when the signal strength of the beacon messages falls below the threshold or when the radio fails to receive a beacon message within a certain time period, which indicates that the radio has moved outside of the coverage area of its current home site.

A radio's performance of the passive channel scan method 200 is next described by reference to a timing diagram 300 illustrated in FIG. 3, where time is increasing from left to right as indicated by the direction of the arrow at the end of the time line at the bottom of FIG. 3. For purposes of this illustrative example, radio 114 is operating in its home site 110 and implementing method 200. Accordingly, radio 114 has stored in its memory a channel list that includes channels labeled A (its current home site channel), B, C, D, and E managed respectively by repeaters 112, 122, 132, 142, 152. The channels in the channel list are arranged in the order A, C, D, B, and E. Upon determining to start (204) the passive channel scan, radio 114 tunes to the radio frequency of channel A (its home site channel) and scans the channel to determine (206) whether a signal is present. Radio 214 uses its transceiver to perform the channel scan and signal detection using any known techniques.

If no signal is detected (206), radio 114 selects (216) and scans the next channel in the order of the channel list to determine (206) whether a signal is present. Radio 114 continues this channel selection and channel scan loop until a signal is detected or until it determines (214) that all channels have been scanned on the list, at which point radio 114 performs (220) a channel sort, which includes selecting or choosing a home site and determining the channel order of the channel list.

Figure 3:
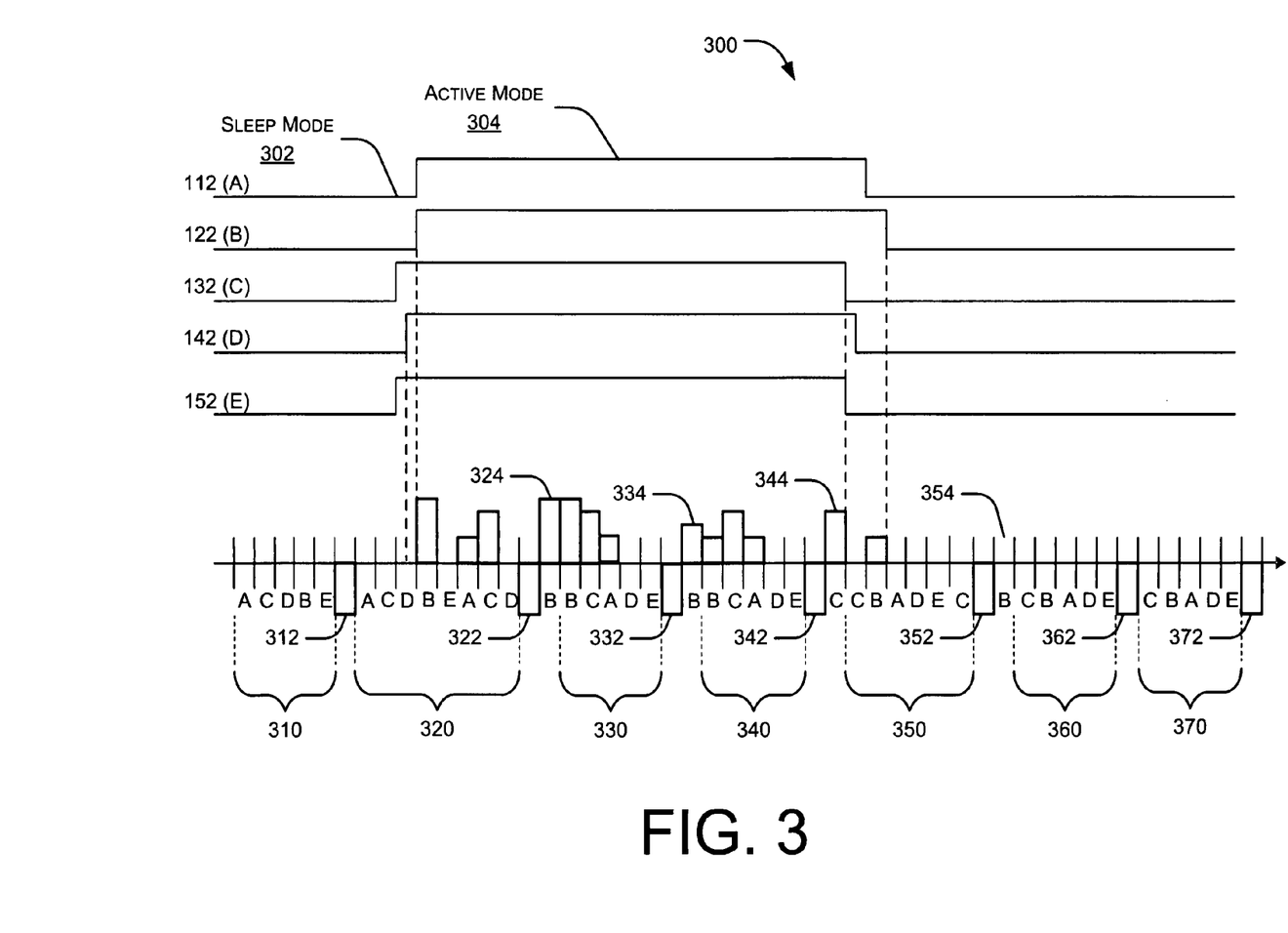
FIG. 3 is a timing diagram used to illustrate a wireless communication unit implementing the site selection method shown in FIG. 2.

Turning momentarily to FIG. 3, radio 114 performs a first passive channel scan 310 during a first time frame. During this passive channel scan, the radio sequentially scans all five channels in the given order (i.e., A, C, D, B, E) at the start of the passive channel scan but fails to detect (206) a signal on any of the channels because all of the respective repeaters 112, 132, 142, 122, and 152 are in the sleep mode. At the conclusion of the passive channel scan 310, during a channel sort 312, radio 114 maintains site 112 associated with channel A as its current home site and maintains the channel order A, C, D, B, E of the channel list for the next passive channel scan.

It should be noted that during the channel sort, "selecting" or "choosing" a home site includes both maintaining the current home site as the "new" home site and selecting a completely different home site as the new home site. In addition, "rearranging" the order of the channels on the channel list includes both maintaining the current order of the channels and actually changing the order to a different order. Moreover, in this embodiment the home site channel was scanned only once during the passive channel scan. However, in another embodiment, the radio can use the home site channel as a "priority channel" and alternately scan the home site channel with each other channel in the list. This enables the radio to remain on the priority channel during half of the channel scan time frame so as not to miss any signal of interest on the home site channel while performing the passive channel scan.

During a subsequent passive channel scan 320 over a subsequent time frame, radio 114 scans the channels in the current order (A, C, D, B, E) beginning with its home site channel A. During this passive channel scan, the repeaters begin to re-key from a sleep mode 302 to an active mode 304 (beginning with repeater 132) in order to repeat a signal, and radio 114 detects (206) the signal on channel B. Although the repeaters re-key at substantially the same time, the re-keying appears asynchronous from the radio's perspective due to various propagation delays through the backend and RF channels, as can be seen in FIG. 3 by the different transition times from sleep mode to active mode for some of the repeaters.

Upon detecting the signal, the radio determines (208) if a synchronization message (SYNC) is present in the signal and if so detects the color code from the signal to see if it matches a known color code for the associated site (site 122 in this case). Checking the color code enables the radio 114 to confirm that it has detected a channel managed by a repeater with which it is authorized to operate since there may be a number of other repeaters (not shown) in the network 100 with which the radio is not authorized to operate but that manage a channel at the same frequency. Attempting to transmit using an unauthorized repeater results in an "illegal" transmission, for instance under the United States Federal Communication Commission rules, which should be avoided. Verifying the color code helps to prevent such illegal transmissions. The format of the SYNC message depends on the particular protocols being used in the network. In a DMR system, for example, the SYNC is included in a 48 bit field in the center of some TDMA bursts, and the color code can be found in the Slot Type field in data bursts and in the EMB field in voice bursts.

If SYNC is not present in the signal (e.g., as in the case of an analog signal) or if the SYNC contains an unknown color code (e.g., due to errors when decoding the color code) or an incorrect color code (one that doesn't match the known color code for the channel), radio 114 proceeds to select (216) and scan the next channel in the list. In this illustrative example, the SYNC is present and the color code matches, so radio 114 measures and records (210) the signal strength of the signal on channel B. This can be done using any suitable method including, but not limited to, an average Received Signal Strength Indication (RSSI), signal-to-noise (SNR) ratio, local mean signal strength measurement, logarithmic signal strength measurement, to name a few. Signal strength is illustrated in FIG. 3 by the height of a bar above the channel labels at the bottom of the drawings. The radio 114 also qualifies the signal to determine (212) whether is it a call of interest, for instance by determining whether it is addressed to the radio or to a group to which the radio belongs. If the call is of interest, radio 114 processes (218) the call and performs (220) the channel sort, which includes selecting as the new home site, home site 122 associated with channel B. Radio 114 further rearranges the channel order by placing channel B at the top of the order. The remaining channels can retain their current relative channel order. Thus for the initial channel order A, C, D, B, E, the new channel order could be B, A, C, D, E.

If the signal on channel B is not of interest, as in this case, radio 114 scans all of the remaining channels on its channel list in the current channel order (i.e., E, A, C, D) and then performs a channel sort 322. Since the signal on channel B was the first signal detected (222) during the passive channel scan 320, scanning all of the remaining channels on the channel list, in this case, comprises "extending" the passive channel scan to rescan some of the channels (e.g., A, C, and D) to afford radio 114 a better opportunity to perform the scanning when all repeaters are in the active mode. Extending the passive channel scan in this manner essentially has the effect of restarting (224) the passive channel scan after the first detected signal to scan all other remaining channels on the channel list.

During the extended passive channel scan 320, radio 114 also measures and records average RSSI for channels A and C. Moreover, the channel sort 322 in this case comprises: determining the channel having a signal with the highest measured and recorded signal strength (in this case channel B, since it has the tallest signal strength bar, followed by channels C then A); selecting channel B as the new home site; and rearranging the channels on the list into a new order for the next passive channel scan based on the measured and recorded signal strengths. In this case, the channels are rearranged into the order B, C, A, D, E.

In a further embodiment, before selecting a new home site and rearranging the order of the channels on the channel list, radio 114 confirms (324) that a signal is still present on the channel having the highest recorded signal strength. This prevents the radio from detecting that a channel has the highest signal strength only because the passive channel scan is being performed during a time frame when some of the repeaters have de-keyed to the sleep mode and some are in the active mode in the process of de-keying. In this case, radio 114 confirms (324) that a signal still exists on channel B, and thereby selects site 112 as its current home site and rearranges the channels on the list into the order B, C, A, D, E based on the signal strengths measured and recorded during the passive channel scan 320.

During a subsequent passive channel scan 330 in the channel order B, C, A, D, E over a subsequent time frame, radio 114 measures and records average RSSI for channels B, C, and A and detects during a channel sort 332 that channel B is again associated with the highest signal strength followed by channels C then A. Upon radio 114 confirming (334) that a signal remains on channel B, the radio retains site 122 (associated with channel B) as its home site and retains the channel order B, C, A, D, E based on the measured and recorded RSSI.

During a subsequent passive channel scan 340 in the channel order B, C, A, D, E over a subsequent time frame, radio 114 measures and records average RSSI for channels B, C, and A and detects during a channel sort 342 that channel C is associated with the highest signal strength followed by channels B and A. Upon radio 114 confirming (344) that a signal remains on channel C, the radio selects site 132 (associated with channel C) as its new home site and rearranges the channel order to C, B, A, D, E based on the measured and recorded RSSI.

During a subsequent passive channel scan 350 in the channel order C, B, A, D, E over a subsequent time frame, the repeaters begin de-keying to the sleep mode, and the radio 114 only measures and records an average RSSI for channel B, which by default has the highest recorded signal strength. However, when the radio 114 attempts to confirm (354) a channel on channel B during a channel sort 352, the radio no longer detects a signal on channel B. Therefore radio 114 retains its current home site 132 and retains the current channel order C, B, A, D, E for the next passive channel scan. Similar to the re-keying process, the repeaters de-key at substantially the same time. However, the de-keying appears asynchronous from the radio's perspective due to various propagation delays through the backend and RF channels, as can be seen in FIG. 3 by the different transition times from active mode to sleep mode for some of the repeaters.

During a subsequent passive channel scan 360 in the channel order C, B, A, D, E over a subsequent time frame, radio 114 fails to detect a signal on any of the channels on its channel list since all of the repeaters are in the sleep mode. Therefore, during a channel sort 362, the radio retains its current home site 132 and retains the current channel order C, B, A, D, E for the next passive channel scan. Likewise, during a subsequent passive channel scan 370 in the channel order C, B, A, D, E over a subsequent time frame, radio 114 fails to detect a signal on any of the channels on its channel list since all of the repeaters remain in the sleep mode. Therefore, during a channel sort 372, the radio retains its current home site 132 and retains the current channel order C, B, A, D, E for the next passive channel scan.

Figure 4:
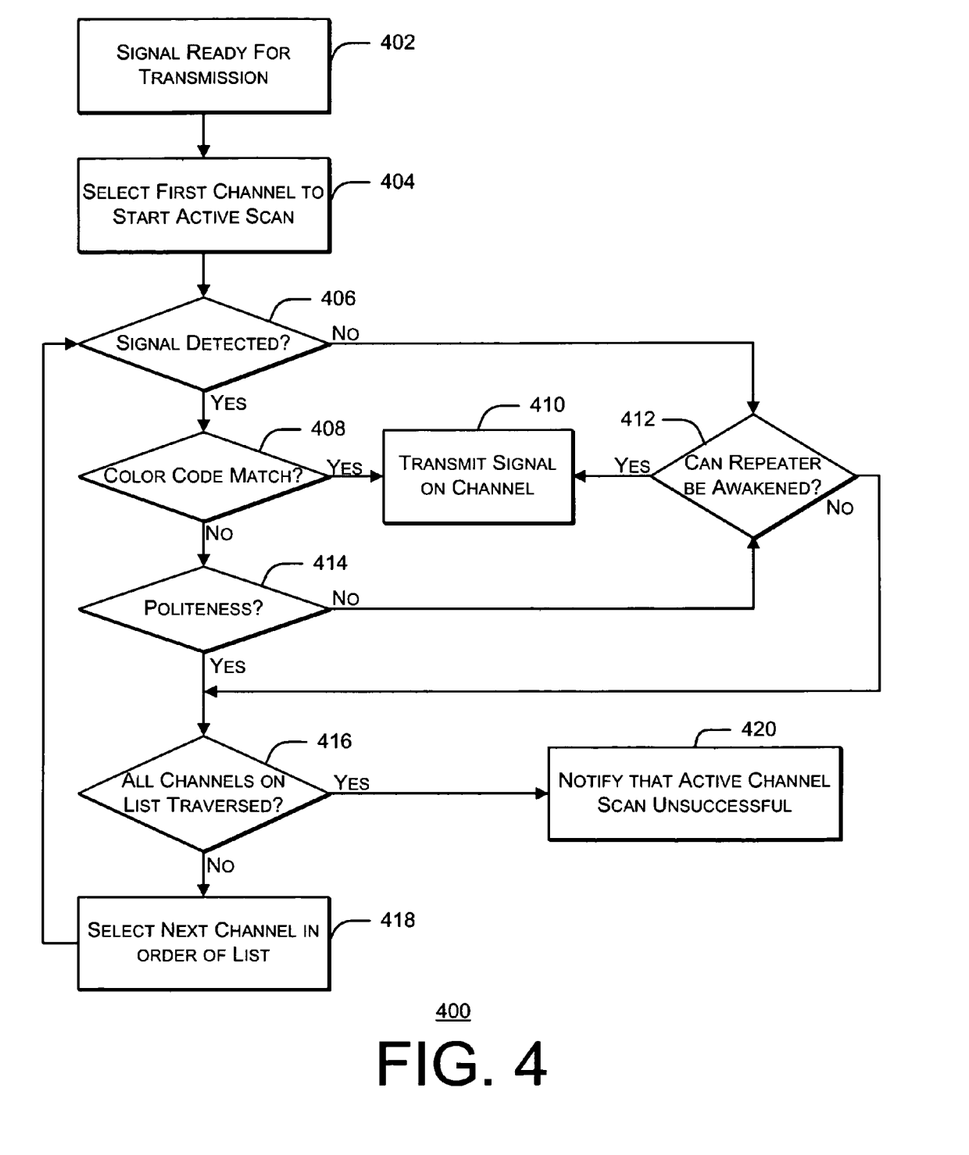
FIG. 4 is a flow diagram of a method for site selection in accordance with an illustrative embodiment.

A benefit of performing a passive channel scan is that it results in an ordering of the channels on a radio's channel list with the channels at the top of the order being those corresponding to sites associated with the highest signal strengths and, therefore, the most likely sites for the radio to successfully start a call. This reduces the time to find a repeater if the ordering of channels resulting from the passive channel scan is used during an active channel scan or active site selection method. FIG. 4 is a flow diagram of a method 400 for "active" site selection in accordance with an illustrative embodiment. Method 400 is deemed an "active" site selection method because the radio may attempt to awaken one or more repeaters to the active mode during the course of performing the method. For purposes of consistency and ease of understanding, radio 114 is described as also performing the method 400.

Method 400 starts upon radio 114 determining that a signal is ready (402) for transmission by the radio. The signal is any type of transmit request generated in the radio as a result of, for example, a user of radio 114 pushing a push-to-talk (PTT) button to send audio, a user manual selection such as the user pressing a button on the radio or using some other user interface (e.g., selecting a menu item) to manually start the active site selection process, etc., the user requesting to send data via a user interface, the radio being programmed to periodically send location data, etc. Radio 114 obtains the channel list which has a given order, which in this embodiment is the order C, B, A, D, E generated during the last passive site selection scan 370, and selects (404) a first channel from the list (which in this case is the home site channel C) to start the active channel scan. In another embodiment, the channel list has an order that is determined in any suitable manner, such as a preprogrammed order.

Upon selecting the home site channel C, radio 114 tunes to the radio frequency of the channel and scans the channel to determine (406) whether a signal is present. If no signal is present, radio 114 sends a message (proprietary or standard) to repeater 132 in an attempt (412) to awaken its repeater. If the repeater confirms that it is awake, e.g., via some acknowledgement message, radio 114 can synchronize to the repeater and transmit (410) signals on channel C. If radio 114 is unable to awaken repeater 132, it determines (416) if it has traversed all channels on the channel list.

If all channels on the channel list have been traversed (either scanned or skipped) at least once (i.e., at least one full scan cycle was completed), radio 114 ends (420) the active channel scan and notifies a user that the active channel scan was unsuccessful, e.g., because of an unsuccessful attempt to send audio or data, because no awake repeater having the correct color code was found, etc. This notification may be some type of indication, e.g., a tone, a message on a display, etc., that the radio is out of range if radio 114 was unable to detect a signal on any of the channels or channel busy where the radio 114 skipped scanning one or more of the channels because a signal was detected on the channel. Moreover, the radio may perform more than one active scan cycle before providing (420) a failure notification to the user. If all channels on the list have not been traversed, radio 114 selects (418) the next channel in the channel order (in this case channel B and continues method 400 by scanning (406) channel B and performing signal detection (408) and a color code comparison (408) to determine whether it can transmit (410) on this channel.

If as a result of scanning channel C, radio 114 detects a signal on the channel, the radio detects SYNC and attempts to detect color code from the signal and determines (408) whether a detected color code matches the known color code corresponding to channel C. If there is a color code match, radio 114 knows that it has detected a channel managed by repeater 132 that it can use to transmit (410) its signals. If radio 114 fails to detect a color code, detects an unknown color code, or the detected color code fails to match the known color code, the radio follows its internal policy for politeness (414) if it has one. If the radio has no politeness policy or if the radio's politeness policy is impolite to all or polite to its own color code only, then the radio attempts (412) to awaken its repeater and if successful uses the repeater for its transmissions.

If radio 114 is unable to awaken (412) its repeater or if its politeness policy (414) is polite to all, the radio skips attempting to awaken its repeater associated with the current selected channel and determines (416) if it has traversed all channels on the channel list. The radio further either ends (420) the active channel scan and notifies a user that the active channel scan was unsuccessful or continues (418) the active channel scan with the next channel in the channel order. If as a result of the active channel scan, radio 114 selects a channel on which to transmit (410), the site associated with this channel is made the current home site, if it is not already the home site. In this case, the radio transmits if there is no signal detected on the channel (but the repeater is keyed); the radio is provisioned with impolite access irrespective of whether any signal is detected on the channel; or the radio is partied to the call that is active on the channel, and its politeness policy allows impolite behavior during a call to which it is partied.

Moreover, in an embodiment, upon the user requesting a manual active site scan, the method 400 begins at the channel with which the previous active channel scan ended, which many times is the channel associated with the current home site. In addition, after the radio awakens a repeater during a manual active site scan, the radio can be programmed to wait for a predetermined duration (e.g., 15 seconds) before starting an active channel scan to provide the user time to lock the radio to the corresponding channel.

In yet another embodiment as briefly mentioned above, the user can lock and unlock the radio to the current home site channel, e.g., through a programmable button or menu in order to prevent the radio from performing a passive channel scan. This is useful when the user stays within a site, and the radio has determined the correct home site channel for its communications. Locking the radio to the current home site channel optimizes call reception performances as well as battery life. In addition, the radio is able to spend more time in a low power mode when operating in the locked state since it ceases to perform passive channel scans.

In yet another embodiment, the radio does not attempt to awaken a particular repeater if the radio is attempting to send data and the radio has unsuccessfully attempted to awaken repeaters within a certain time frame (e.g., 30 seconds). This limits unwanted inbound transmissions, especially when the radio is out of the coverage area of the multi-site communication system and is attempting to send periodic data like location updates.

In the foregoing specification, specific embodiments have been described. However, one of ordinary skill in the art will appreciate that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the sequence of steps in a flow diagram or elements in the claims, even when preceded by a letter does not imply or require that sequence.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for selecting a home site while roaming in a multi-site communication system, the method comprising:

detecting a first signal on a channel in the communication system, wherein the channel is one of a plurality of channels that are arranged in a first order on a list of channels, and wherein each of the channels on the list is associated with a different site in a multi-site communication system;

upon detecting the first signal, attempting during a first time frame to measure and record signal strength of a signal at each of the channels on the list based on the first order and beginning with the detected first signal;

selecting as a current home site, the site associated with the channel on the list having the signal with a highest signal strength recorded during the first time frame; and rearranging the channels on the list into a second order based on the signal strengths recorded during the first time frame;

attempting during a second time frame subsequent to the first time frame to measure and record signal strength of a signal at each of the channels on the list based on the second order and beginning with the channel associated with the current home site;

determining the channel from the list having the signal with a highest signal strength recorded during the second time frame; determining whether the signal with the highest signal strength recorded during the second time frame can still be detected at a subsequent time to the second time frame;

if the signal with the highest signal strength recorded during the second time frame can still be detected, then selecting as a new home site, the site associated with the channel having the signal with the highest signal strength recorded during the second time frame, and rearranging the channels on the list into a third order based on the signal strengths recorded during the second time frame.

2. The method of claim 1, wherein the attempting to measure and record during the second time frame is performed after the signal strength measured for a signal at the channel associated with the current home site falls below a signal strength threshold.

3. The method of claim 1, wherein the attempting to measure and record signal strength during the first and second time frames is performed by a wireless communication device that is not participating in a call on any of the channels on the list.

4. The method of claim 1, wherein the new home site is selected only if the signal strength recorded for the signal at its associated channel exceeds by a threshold the signal strength recorded for the signal at the channel associated with the current home site.

5. The method of claim 1, wherein the attempting to measure and record during the second time frame is performed after a beacon message is not received on the channel associated with the current home site for a first time period.

6. The method of claim 1, wherein the measured signal strengths are recorded for the detected signals that include a repeater synchronization and an expected system identification.

7. The method of claim 1, wherein each channel on the list is managed by a different repeater at the associated site, and wherein each repeater has an active mode and a sleep mode and is associated with a known system identification, the method further comprising:
a) determining to transmit a signal;
b) beginning with the channel associated with the current home site, when no signal is detected from the repeater managing the channel and associated with the known system identification, attempting to awake the repeater from the sleep mode to the active mode, and if the attempting to awake is successful, using the repeater to transmit the signal;
c) otherwise selecting the next channel in the second order and when no signal is detected from the repeater managing the channel and associated with the known system identification, attempting to awake the repeater from the sleep mode to the active mode, and if the attempting to awake is successful, using the repeater to transmit the signal;
d) otherwise, repeating c) until a first repeater is confirmed as being in the active mode and having the known system identification or until all the of the channels on the list have been selected at least once.

8. The method of claim 7 further comprising:
using the first confirmed repeater to transmit the signal; and
selecting, as the new home site, the site associated with the channel managed by the first confirmed repeater.

9. The method of claim 7 further comprising providing an indication to a user of a failure to transmit if all of the channels on the list have been selected at least once without a repeater being confirmed as being in the active mode and having the known system identification.

10. The method of claim 7, wherein the attempting to awake is performed according to a rule of politeness comprising one of:
attempting to awake the repeater only if no signal is detected on the channel;
attempting to awake the repeater even if a signal from a repeater having an unknown system identification, an incorrect system identification, or no system identification is detected on the channel; or
attempting to awake the repeater irrespective of whether any signal is detected on the channel.

11. The method of claim 7, wherein the attempting to awake a repeater is a result of a manual user selection.

12. A method for selecting a home site while roaming in a multi-site communication system, the method comprising:
arranging a plurality of channels on a list during a first time frame, wherein each of the channels on the list is associated with a different site in a multi-site communication system, and wherein the channels on the list are arranged in a first order beginning with the channel associated with a current home site;
attempting during a second time frame subsequent to the first time frame to measure and record signal strength of a signal at each of the channels on the list based on the first order and beginning with the channel associated with the current home site; determining the channel from the list having the signal with a highest signal strength recorded during the second time frame;
determining whether the signal with the highest signal strength recorded during the second time frame can still be detected at a subsequent time to the second time frame;
if the signal with the highest signal strength recorded during the second time frame can still be detected, then selecting as a new home site, the site associated with the channel having the signal with the highest signal strength recorded during the second time frame, and re-arranging the channels on the list into a second order based on the signal strengths recorded during the second time frame.

13. A method for selecting a home site while roaming in a multi-site communication system, the method comprising:
a) arranging a plurality of channels on a list during a first time frame, wherein each of the channels on the list is associated with a different site in a multi-site communication system and is managed by a different repeater at the associated site, wherein each repeater has an active mode and a sleep mode and is associated with a known system identification, and wherein the channels on the list are arranged in a first order beginning with the channel associated with a current home site;
b) determining to transmit a signal;
c) beginning with the channel associated with the current home site, when no signal is detected from the repeater managing the channel and associated with the known system identification, attempting to awake the repeater from the sleep mode to the active mode, and if the attempting to awake is successful, using the repeater to transmit the signal;
d) otherwise selecting the next channel in the first order and when no signal is detected from the repeater managing the channel and associated with the known system identification, attempting to awake the repeater from the sleep mode to the active mode, and if the attempting to awake is successful, using the repeater to transmit the signal;

e) otherwise, repeating d) until a first repeater is confirmed as being in the active mode and having the known system identification or until all the of the channels on the list have been selected at least once;
f) upon confirming the first repeater as being in the active mode and having the known system identification, using the first confirmed repeater to transmit the signal; and selecting as the new home the site associated with the channel managed by the first confirmed repeater.

* * * * *

UNITED STATES PATENT AND TRADEMARK OFFICE
CERTIFICATE OF CORRECTION

PATENT NO. : 8,045,982 B2  
APPLICATION NO. : 12/253478  
DATED : October 25, 2011  
INVENTOR(S) : Khoo et al.

Page 1 of 1

It is certified that error appears in the above-identified patent and that said Letters Patent is hereby corrected as shown below:

In Column 13, Line 57, in Claim 7, delete "all the" and insert -- all --, therefor.

In Column 14, Line 5, in Claim 10, delete "channel:" and insert -- channel; --, therefor.

In Column 15, Line 3, in Claim 13, delete "all the" and insert -- all --, therefor.

In Column 16, Line 2, in Claim 13, delete "home the" and insert -- home --, therefor.

Signed and Sealed this  
Eighteenth Day of December, 2012

David J. Kappos  
*Director of the United States Patent and Trademark Office*